Figure 9:
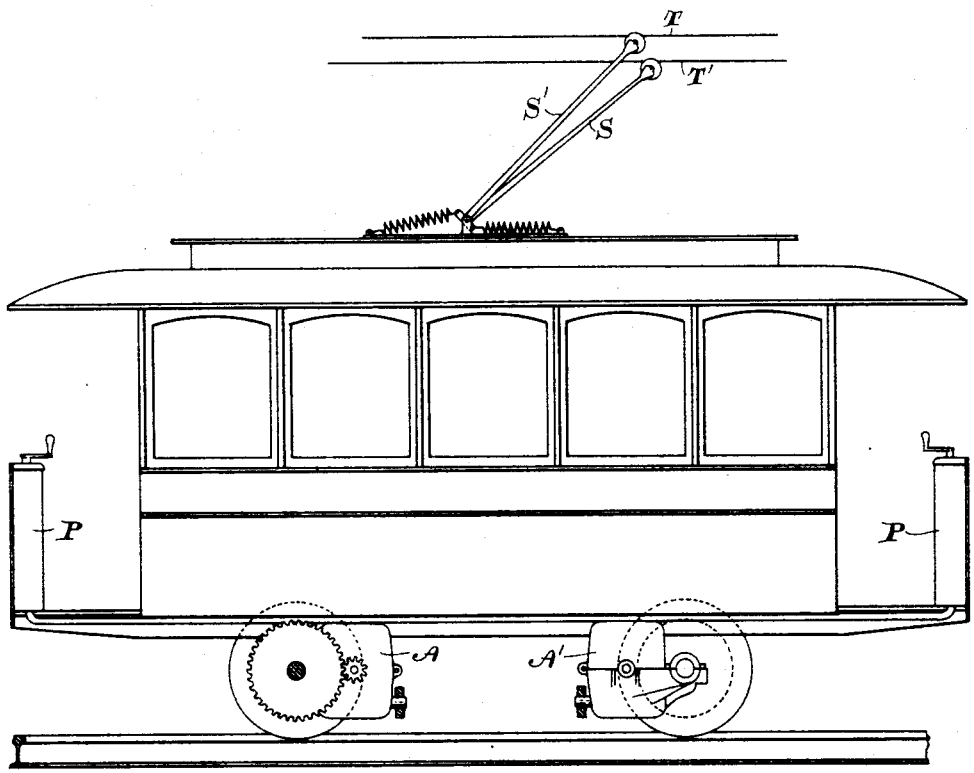

(No Model.) 2 Sheets—Sheet 1.
A. H. ARMSTRONG.
REGULATING ALTERNATING CURRENT INDUCTION MOTORS.
No. 539,404. Patented May 21, 1895.
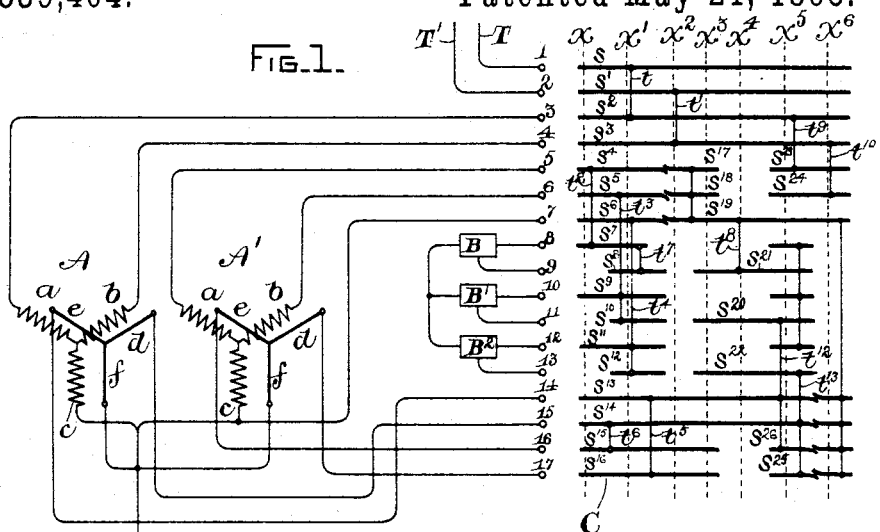
Fig. 1.
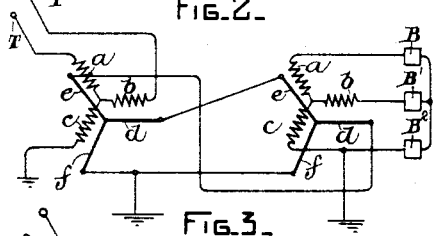
Fig. 2.
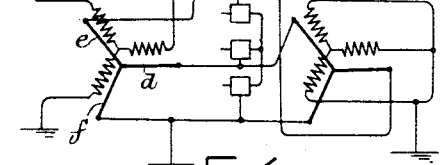
Fig. 5.
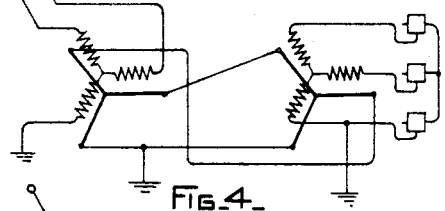
Fig. 3.
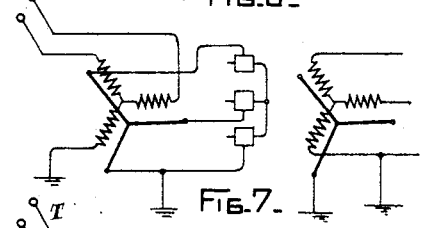
Fig. 6.
Fig. 4.
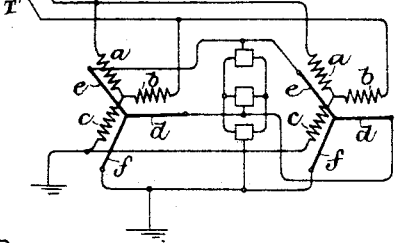
Fig. 7.
Fig. 8.
WITNESSES —
A. F. Macdonald.
B. B. Hull.
INVENTOR —
Albert H. Armstrong
By Geo. R. Blodgett
Atty.

(No Model.) 2 Sheets—Sheet 2.

A. H. ARMSTRONG.
REGULATING ALTERNATING CURRENT INDUCTION MOTORS.

No. 539,404. Patented May 21, 1895.

WITNESSES.
A. F. Macdonald.
B. B. Hull.

INVENTOR.
Albert H. Armstrong
By R. Blodgett
Atty.

UNITED STATES PATENT OFFICE.

ALBERT H. ARMSTRONG, OF SCHENECTADY, NEW YORK, ASSIGNOR, BY MESNE ASSIGNMENTS, TO THE GENERAL ELECTRIC COMPANY, OF SAME PLACE.

REGULATING ALTERNATING-CURRENT INDUCTION-MOTORS.

SPECIFICATION forming part of Letters Patent No. 539,404, dated May 21, 1895.

Application filed December 5, 1894. Serial No. 530,848. (No model.)

*To all whom it may concern:*

Be it known that I, ALBERT H. ARMSTRONG, a citizen of the United States, residing at Schenectady, county of Schenectady, State of New York, have invented certain new and useful Improvements in Regulating Alternating-Current Induction-Motors, of which the following is a specification.

The present invention relates to a novel method of regulating mechanism driven by alternating current motors of the induction type, which consists in coupling the motors in tandem for one rate of speed, and changing them to multiple for a higher rate of speed through a number of intermediate steps, as hereinafter explained, of which the more important are: closing the secondary circuit of the leader of the series of motors through a resistance, which thereby shunts the primary member of the second motor, then open-circuiting the second motor, and finally, re-connecting it in multiple with the first motor and closing its secondary through a resistance in multiple with the secondary of the first motor.

The invention also comprises a novel form of controlling switch for effecting the various circuit combinations which are formed in practicing the invention.

In the drawings, Figure 1 illustrates two induction-motors in diagram and the development of a controller. Figs. 2 to 8, inclusive, are diagrams illustrating various combinations of circuits which the controller of Fig. 1 is designed to form at different times, and Fig. 9 shows a railway-car driven by two motors and regulated in accordance with this invention.

In describing the invention hereinafter, where I speak of connecting the motors in tandem, my meaning is that the secondary of one motor is in circuit with the primary member of a second motor, the secondary of the second motor being either closed through a resistance or directly short-circuited, as is customary with induction motors. So, also, in speaking of changing the motors from tandem to multiple, my meaning is that the circuit connections just explained are so changed, that the primaries of the motors are coupled in multiple with the supply mains, and their secondaries closed.

The broad invention of connecting alternating induction motors in tandem, and of changing them from tandem to multiple connection is not novel with me. The advantages of such an arrangement are understood in the art, so that they need not be herein fully explained. In general, it enables the speed of mechanism driven by alternating induction motors to be regulated in a manner corresponding to the regulation secured by changing direct current motors from series to parallel.

Referring to Fig. 1 of the drawings, A A' represent two induction motors of the ordinary three-phase type. Each motor consists of a primary and secondary member, wound with three interconnected coils, in a manner well understood in the art. The winding shown in diagram is commonly known as the "Y" winding, though this is not in any sense an essential feature of the invention.

Three resistances are shown at B B' B², and the development of a controller cylinder is shown at C, having contacts represented in black lines, which are interconnected as shown by the cross lines. The cylinder contacts connect with a series of brushes, 1 to 17 inclusive, which are connected as follows: The brushes 1, 2, are the terminals of trolley wires T T' which represent in general two of the mains of a three-phase circuit. Brushes 3, 4, are respectively connected to the $a$ $b$ coils of motor A. Brushes 5, 6, are correspondingly connected to the $a$ $b$ coils of motor A'. Brush 7 is grounded and connected to the $c$ and $f$ coils of motors A A'. Brushes 8, 9, 10, 11, 12, 13 are connected to the resistances B, B', B², as indicated. Brushes 14, 15, are connected respectively to coils $e$ $d$ of motor A, and brushes 16, 17, to the corresponding coils of motor A'. In the off position of the controller, as indicated in the drawings, all the circuits are open.

In the first running position corresponding to dotted line $x$, the circuits correspond with the diagram, Fig. 2, and the various connections indicated in the diagram may be traced through the controller as follows:

Trolley T is connected through contact $s$, cross-connection $t$, contact $s^2$ and brush 3 with the outer terminal of coil $a$ of the motor A. From the common joint of the motor coils one branch of the circuit leads directly to ground through the coil $c$. The other circuit passes through coil $b$, brush 4, contact $s^3$, cross-connection $t'$, contact $s'$, brush 2, and so to the trolley T'. The $d\ e\ f$ coils which form the secondary winding of motor A are connected respectively to the $e\ d\ f$ coils of motor A', which, as is indicated in the diagram Fig. 2, constitute the primary winding of motor A'.

The connections may be traced through the controller as follows: from coil $d$ of motor A, through brush 15, contact $s^{14}$, cross-connection $t^6$, contact $s^{15}$, brush 16, to coil $e$ of motor A'. The $f$ coils of the two motors are directly connected and are both grounded. The $e$ coil of motor A is connected through brush 14, contact $s^{13}$, cross-connection $t^5$, contact $s^{16}$ and brush 17 with the $d$ coil of motor A'. The secondary coils $a, b, c$, of motor A' are closed through the resistances as follows: Coil $a$ is connected by brush 5, contact $s^4$, cross-connection $t^2$, contact $s^7$ and brush 8 to resistance B. The $b$ coil of the motor is connected to resistance B' through brush 6, contact $s^5$, cross-connection $t^3$, contact $s^9$ and brush 10, and in a similar manner the $c$ coil of motor A' is joined to resistance B$^2$ by a path including brush 7, contact $s^6$, cross-connection $t^4$, contact $s^{11}$ and brush 12. The other terminals of the resistances are connected as shown. Hence in the first position of the controller the two motors are coupled in tandem with full resistance in the secondary circuit of motor A'.

Moving the controller to the second position indicated by dotted line $x'$, shunts a portion of the resistance, but otherwise leaves the circuit connections unchanged, as indicated in Fig. 3.

The brushes 5, 6 and 7 leading from the $a\ b\ c$ coils of motor A' are now connected with the brushes 9, 11 and 13, so that a portion of the resistance is short-circuited. The connection from brush 5 to brush 9 includes contact $s^4$, cross-connection $t^2$, contact $s^7$, cross-connection $t^7$ and contact $s^8$. The contacts $s^5$ and $s^{10}$, on which rest the brushes 6 and 11, are cross-connected at $t^3$, as are also the contacts $s^6$ and $s^{12}$ upon which rest brushes $s^7\ s^{13}$.

In the next running position of the controller, corresponding to dotted line $x^2$, and shown in diagram at Fig. 4, the resistance is entirely short-circuited. In this position the brushes, 5, 6, 7, rest upon contacts $s^{17}, s^{18}, s^{19}$, all of which are directly connected, as shown. These last named contacts are shown overlapping contacts $s^4, s^5, s^6$, to indicate that the circuit is not broken in passing from position $x'$ to $x^2$.

The next position of the controller at $x^3$ is preparatory to changing the motors to multiple connection. A diagram of the circuit connections is shown in Fig. 5. The resistances which were out of circuit at position $x^2$ are now connected across the leads joining the $d\ e\ f$ coils of the two motors, so that the motor A' is thereby shunted. The brushes 7, 14 and 15 leading from the three secondary coils of motor A are respectively connected with the brushes 9, 11, 13 which lead to the resistances. Brush 7 rests on contact $s^{19}$, which is cross-connected at $t^8$ to contact $s^{21}$ on which rests brush 9. Brush 14 rests on contact $s^{18}$ which is cross-connected at $t^{12}$ to contact $s^{20}$, on which rests brush 11. Contacts $s^{14}$ and $s^{22}$ on which rest brushes 15 and 13, are cross-connected at $t^{13}$. The remaining connections are the same as in the diagram Fig. 4, and already described. I have shown half of the resistances as used in this position of the controller, though this is a minor feature and not essential to the invention.

In moving to the next position $x^4$, the controller open-circuits motor A' leaving motor A in circuit with its secondary closed through the resistance, as is diagrammatically illustrated in Fig. 6. The brushes 5 and 6 on leaving the contacts $s^{17}\ s^{18}$ open the secondary circuit of motor A', and in a similar manner its primary circuit is opened when the brushes 16 and 17 pass out of contact with $s^{15}\ s^{16}$.

When the controller is moved to the position indicated at $x^5$ and diagram Fig. 7, the motor A' is again brought into circuit, and it is now coupled in multiple with the motor A. For convenience the connections are changed so that the $a\ b\ c$ coils of motor A' now become the primary winding instead of the secondary winding, as was the case in the prior combinations already described. Similarly, the $d\ e\ f$ coils now become secondaries. This, however, is not essential to the invention and I desire to cover an arrangement in which the function of the coils is not thus changed, a given set remaining at all times primary or secondary whether the motors are in tandem or multiple.

By referring to the diagram, Fig. 7, the circuit connections may be readily traced. The brushes connected to the $a\ b\ c$ coils of motor A are connected through the controller to the trolleys T T$^3$, and to ground, as before. In like manner, the $d\ e\ f$ coils of this motor are connected with the resistances by brushes 9, 11, 13, as before. The $c$ coil of motor A' is connected to ground and the $a\ b$ coils are connected respectively to the trolleys T T', since the brush 5 rests on contact $s^{23}$, which is connected to contact $s$ by cross-connections $t^9, t$ and the brush 6 rests on contact $s^{24}$, which by cross-connections $t^{10}, t'$ is joined to contact $s'$ and brush 2. The $d\ e\ f$ coils of motor A' are in multiple with the corresponding coils of motor A, and closed through resistances. Coil $d$ of motor A' is connected through brush 17, contact $s^{25}$, cross-connection $t^{13}$, contact $s^{22}$ and brush 13 with the resistance B$^2$. Coil $e$ is connected through brush 16, contact $s^{26}$, cross-connection $t^{12}$, contact $s^{20}$ and brush 11 with the resistance B'. Coil $f$ is connected with brush 7, contact $s^{19}$, cross-connection $l^8$, contact $s^{21}$ and brush 9 with resistance B.

In the last position of the controller $x^6$ the only change which is made consists in cutting out the resistances so that the primary and secondary windings of the two motors are respectively coupled in multiple. The circuit connections will readily be traced from the drawings, and need not be further described. Fig. 8 shows in diagram how the various motor coils are connected.

In Fig. 9 there is illustrated a railway car having induction motors A A' geared to its respective axles. Trolley wires T T' form two of the circuit mains, while the track and ground form the third main. The circuit is completed through the motors by the wheels of the car and the trolleys S S'. The desired circuit combinations are effected by drum controllers, P, which rotate on a vertical axis, and are similar in construction to series-parallel controllers used with direct current motors, except in the arrangement of contacts, one form of which has been already explained.

What I claim as new, and desire to secure by Letters Patent of the United States, is—

1. The method of regulating mechanism driven by two or more induction motors, which consists in coupling the motors in tandem, then open-circuiting one motor, and finally connecting the primary members of the motors in multiple with their secondaries closed, as set forth.

2. The method of regulating mechanism driven by two or more induction motors, which consists in connecting the motors in tandem, shunting the primary member of the second motor so connected, and finally connecting the motors in multiple with their respective secondary members closed, as set forth.

3. The method of regulating mechanism driven by two or more induction motors, which consists in connecting the secondary of one such motor with the primary of a second motor, then closing the secondary of the first motor through a resistance which shunts the second motor, opening the circuit of the second motor and connecting the motors in multiple, as described.

4. The combination of two or more induction motors geared to a common driven mechanism, and a resistance; with a switch having contacts arranged to connect the motors in tandem and in multiple, and contact for closing the secondary circuit of the first motor through resistances, and then opening the circuit of the second motor, as set forth.

5. The combination of two or more induction motors geared to a common driven mechanism, and a resistance; with a switch having contacts so arranged that in successive positions of the switch the motors are coupled in tandem and then the second motor is shunted through a resistance, then the second motor is open circuited, and finally the motors are connected in multiple, as set forth.

In witness whereof I have hereunto set my hand this 3d day of December, 1894.

ALBERT H. ARMSTRONG.

Witnesses:
   B. B. HULL,
   J. L. D. LANGDON.